United States Patent
Whiton et al.

Patent No.: US 6,716,547 B2
Date of Patent: Apr. 6, 2004

(54) AIR CONDITION ASSISTED WATER RECOVERY DEVICE INTEGRATED WITH CELL STACK ASSEMBLY

(75) Inventors: John Whiton, South Windsor, CT (US); Paul Margiott, South Windsor, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 49 days.

(21) Appl. No.: 10/102,386

(22) Filed: Mar. 18, 2002

(65) Prior Publication Data
US 2003/0186098 A1 Oct. 2, 2003

(51) Int. Cl.$^7$ ................................. H01M 8/12
(52) U.S. Cl. ................... 429/26; 429/13; 429/17
(58) Field of Search ................. 429/13, 17, 26

(56) References Cited

U.S. PATENT DOCUMENTS

| | | | |
|---|---|---|---|
| 5,132,174 A | * | 7/1992 | Romanowski et al. ........ 429/26 |
| 5,264,299 A | | 11/1993 | Krasij et al. |
| 5,853,909 A | | 12/1998 | Reiser |
| 6,013,385 A | | 1/2000 | DuBose |
| 6,015,634 A | | 1/2000 | Bonville, Jr. et al. |
| 6,020,083 A | | 2/2000 | Breault et al. |
| 6,159,628 A | | 12/2000 | Grasso et al. |
| 6,165,634 A | | 12/2000 | Krasij et al. |
| 6,232,006 B1 | * | 5/2001 | Breault ................. 429/26 |

* cited by examiner

Primary Examiner—Patrick Ryan
Assistant Examiner—Dah-Wei Yuan
(74) Attorney, Agent, or Firm—Bachman & LaPointe

(57) ABSTRACT

A cell stack assembly includes a plurality of plates defining a primary cell stack portion having a primary air flow path, a fuel flow path and a primary coolant flow path; and an auxiliary coolant stack portion defining an auxiliary air flow path and an auxiliary coolant flow path, the auxiliary air flow path being communicated with the primary air flow path, whereby water is condensed from air in the auxiliary air flow path.

10 Claims, 2 Drawing Sheets

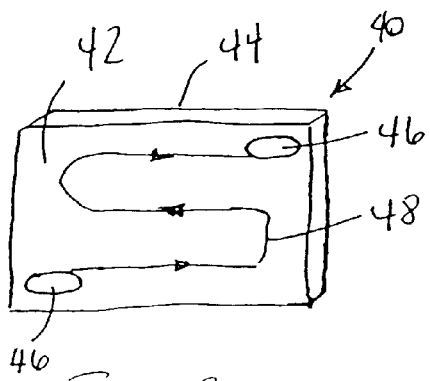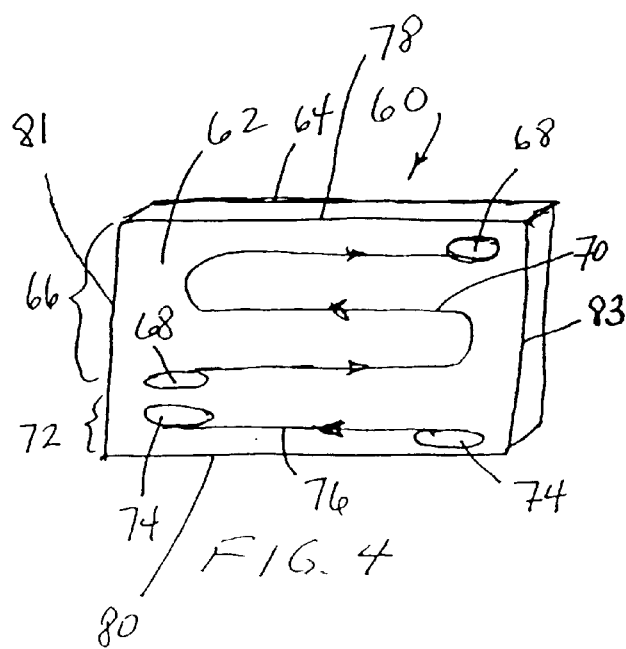

AIR CONDITION ASSISTED WATER RECOVERY DEVICE INTEGRATED WITH CELL STACK ASSEMBLY

BACKGROUND OF THE INVENTION

The invention relates to fuel cell power plants and, more particularly, to a cell stack assembly with integrated auxiliary water recovery device for expanding the operating parameters of the cell stack assembly.

Fuel cell power plants are well known and are commonly used to produce electrical energy from reducing and oxidizing fluids to power various electrical apparatus. In such power plants, a plurality of planar fuel cells are typically arranged in a stack surrounded by an electrically insulating frame that defines manifolds for directing flow of reducing fluid, oxidizing fluid, coolant and product streams. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane (PEM) as the electrolyte, the hydrogen electrochemically reacts at the anode catalyst to produce hydrogen ions and electrodes. The electrodes are conducted to an external load circuit and then returned to the cathode electrode, while the hydrogen ions transfer through the electrolyte to the cathode electrode, where they react with the oxidant and electrodes to produce water and release thermal energy.

In operation of a fuel cell employing a PEM, the membrane is saturated with water, and the anode electrode adjacent to the membrane must remain at least partially saturated with $H_2O$. Product water formed at the cathode electrode that is not removed through a water transport plate as shown in commonly owned U.S. Pat. No. 5,853,909 is removed by evaporation or entrainment into a circulating gaseous stream of oxidant, and can be lost if not recovered from the stream prior to venting. It is critical, however, that proper water balance be maintained between a rate at which water is produced at the cathode electrode, and rates at which water is removed from the cell. Thus, it is critical to recover sufficient water from the exhaust stream such that water lost in the exhaust stream is made up from water obtained from incoming reactants and that produced in the cell.

Numerous methods and efforts have been undertaken to recover such water. Typically, these efforts lead to additional equipment and the like that typically add weight and volume. However, one primary area of interest for use of fuel cell power plants is in automotive applications, where space and weight are critical.

Thus, the need remains for space and weight-efficient methods and structures for maintaining water balance in fuel cell power plants so as to expand the operating parameters of use for same.

It is the primary object of the present invention to provide such a structure and method.

Other objects and advantages of the present invention will appear hereinbelow.

SUMMARY OF THE INVENTION

In accordance with the present invention, the foregoing objects and advantages have been readily attained.

According to the invention, a cell stack assembly is provided which comprises a plurality of plates defining a primary cell stack portion having a primary air flow path, a fuel flow path and a primary coolant flow path; and an auxiliary coolant stack portion defining an auxiliary air flow path and an auxiliary coolant flow path, said auxiliary air flow path being communicated with said primary air flow path, wherein water is condensed from air in said auxiliary air flow path.

In further accordance with the present invention, a method for enhancing water recovery from a cell stack assembly is provided, which method comprises the steps of providing a cell stack assembly comprising a plurality of plates defining a primary cell stack portion having a primary air flow path, a fuel flow path and a primary coolant flow path; and an auxiliary coolant stack portion defining an auxiliary air flow path and an auxiliary coolant flow path, said auxiliary air flow path being communicated with said primary air flow path; flowing fuel through said fuel flow path and oxidant through said primary air flow path so as to generate electricity from said cell stack assembly and an at least partially saturated exhaust gas from said primary air flow path; and flowing said at least partially saturated exhaust gas through said auxiliary air flow path and an auxiliary coolant through said auxiliary coolant flow path so as to cool said at least partially saturated exhaust stream and condense water from said at least partially saturated exhaust stream.

In accordance with the present invention, auxiliary cooling of the at least partially saturated exhaust stream from at least the cathode is provided in a manner which expands the size or space occupied by the fuel cell power plant in less than or equal to one dimension of the three-dimensional space occupied by the fuel cell power plant. Further, the structure and method of the present invention substantially reduces and/or eliminates the need for external or additional flow structures to convey the exhaust stream to separate devices, and instead integrates the auxiliary water recovery into the manifold and/or plate structure of the fuel cell power plant.

BRIEF DESCRIPTION OF THE DRAWINGS

A detailed description of preferred embodiments of the present invention follows, with reference to the attached drawings, wherein:

FIG. 3 illustrates a plate element of a cell stack assembly in accordance with the embodiment of FIG. 1; and FIG. 4 illustrates a plate element of a cell stack assembly in accordance with the embodiment of FIG. 2.

DETAILED DESCRIPTION

The invention relates to a water recovery device which is integrated into a fuel cell power plant or cell stack assembly. This advantageously provides for auxiliary water recovery in the device without external components and the like.

Figure 1:
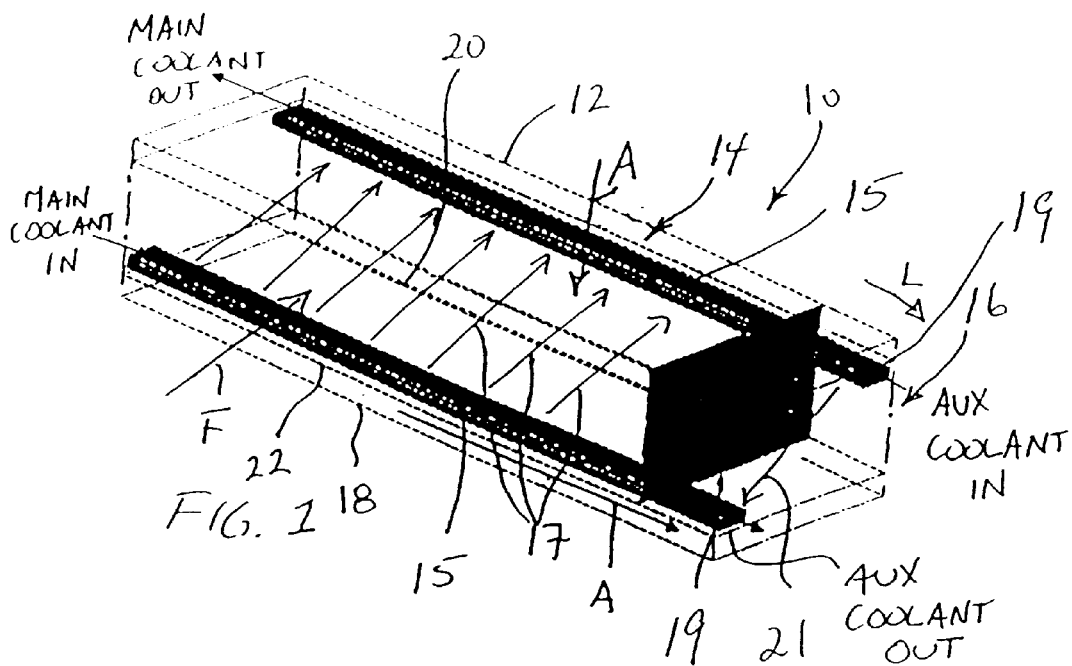
FIG. 1 schematically shows one embodiment of a cell stack assembly in accordance with the present invention.

FIG. 1 schematically illustrates a cell stack assembly 10 in accordance with one embodiment of the present invention. Cell stack assembly 10 has an air inlet manifold 12, a primary cell stack portion 14, an auxiliary coolant portion 16 and an air manifold 18. Primary portion 14 and auxiliary coolant portion 16 are defined by a series of stacked plates (FIG. 3), which will be further illustrated and described below, and define a primary air flow path, a fuel flow path, and a main coolant flow path through primary portion 14. These plates also define an auxiliary air flow path and an auxiliary coolant flow path through auxiliary coolant portion 16. These paths will be further discussed and illustrated below.

According to the invention auxiliary coolant is utilized to condense water from the exhaust stream and thereby assist in maintaining water balance. Auxiliary coolant for the auxiliary coolant flow path can be obtained from any source of sufficiently cool fluid, for example, from an air conditioning unit of a vehicle and the like.

In the embodiment of FIG. 1, primary portion 14 is a substantially rectangular-shaped member having a top surface 20, a bottom surface 22, two long sides and two short sides. In this embodiment, auxiliary coolant portion 16 is defined extending from one of the short sides in one dimension only, which is shown as the length or L dimension. Thus, auxiliary coolant portion 16 advantageously increases only the length of cell stack assembly 10, and not the height or width. The plates of cell stack assembly 10, as will be discussed below, define a fuel flow path as shown by arrow F, and a primary air flow path as shown by arrow A. Air enters air inlet manifold 12, and flows through the primary air flow path in primary portion 14 to air manifold 18. From air manifold 18, air flows to auxiliary coolant portion 16 and eventually exits cell stack assembly 10.

Main coolant is fed through the main coolant path, a portion of which is shown in FIG. 1 at reference number 15, and the remainder of which is schematically illustrated by arrows 17, to cool primary portion 14. In addition, auxiliary coolant is fed to an auxiliary coolant path, a portion of which is shown in FIG. 1 at reference number 19, and the remainder of which is schematically illustrated by arrow 21, so as to further cool air in auxiliary coolant portion 16 and thereby condense water in the air and assist in maintaining cell stack assembly 10 in water balance. This is particularly desirable when cell stack assembly 10 is being used in an environment where the air or oxidant source is ambient air at a high temperature which typically makes maintaining the water balance difficult. Cell stack assembly 10 in accordance with the present invention advantageously provides for additional cooling of the at least partially saturated exhaust stream or air flow coming from primary portion 14 so as to condense water in this flow and assist in recovery of same.

Figure 2:
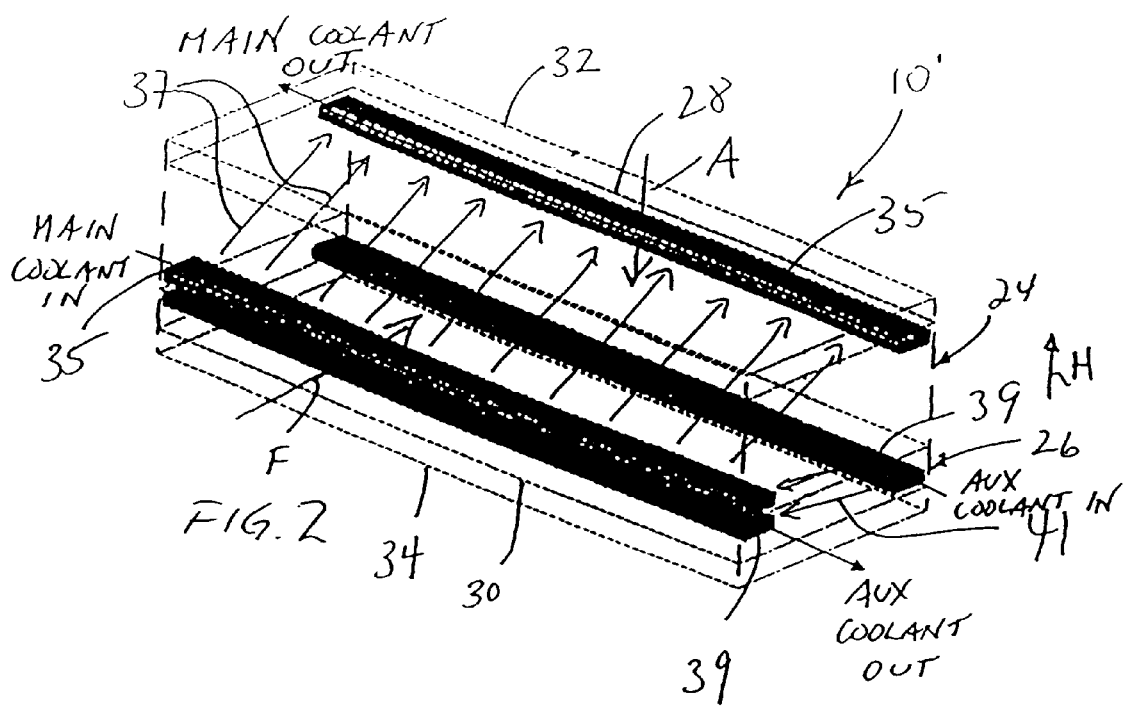
FIG. 2 schematically illustrates another embodiment of a cell stack assembly in accordance with the present invention.

Turning to FIG. 2, an alternative embodiment is shown of a cell stack assembly 10' wherein adjacent plates (FIG. 4), which will be described below, define a primary portion 24 and an auxiliary coolant portion 26 as shown. In this embodiment, as in the embodiment of FIG. 1, the plates define a substantially rectangular structure having a top surface 28 and a bottom surface 30, and primary portion 24 is defined in an upper portion of cell stack assembly 10', while auxiliary coolant portion 26 is defined in a lower portion thereof.

Cell stack assembly 10', as in the embodiment of FIG. 1, also includes an air inlet manifold 32 and an air outlet manifold 34. The plates of cell stack assembly 10' define a fuel flow passage in primary portion 24 as shown by arrow F, and an air flow path in primary portion 14 as shown by arrow A. The air flow path continues from primary portion 24 through auxiliary portion 26 and into air outlet manifold 34 as desired.

In the embodiment of FIG. 2, the cell stack plates also define a main coolant flow path a portion of which is shown at 35 with the remainder illustrated schematically by arrows 37 for cooling primary portion 24 as desired. Further, the cell stack plates also define an auxiliary coolant flow path a portion of which is shown at 39 with the remainder being schematically illustrated by arrows 41. The main and auxiliary coolant inlets and outlets are shown in FIG. 2.

It should be appreciated that in the embodiment of FIG. 1, the main coolant flow travels the length of primary portion 14 only, while the auxiliary coolant flow travels the length of auxiliary cooling portion 16. In the embodiment of FIG. 2, both coolant flow paths travel the entire length of the assembly.

Turning to FIG. 3, a plate 40 is shown having structure which would be used for defining cell stack assembly 10 of the embodiment of FIG. 1. As shown, plate 40 is a substantially planar member having oppositely facing flat sides 42, 44. Plates 40 are provided with through passages 46 and/or internal grooves or passages 48 which define a particular coolant flow path, and exterior grooves (not shown) for the fuel and air flow paths, which are needed for a functional cell stack assembly. Adjacent plates in this embodiment would also be provided having through passages 46 which collectively form portions 15, 19 of the coolant flow paths of FIG. 1. External grooves (not shown) in such plates would alternatively be positioned so as to define the desired air flow paths from top surfaces to bottom surfaces, and fuel flow paths from side to side. In this manner, each plate 40 serves as a cell separator plate, and has, typically, air flow paths defined on one side, fuel flow paths defined on the other, and an internal coolant flow path defined by internal passages 48. In this embodiment, coolant would flow in through one series of lined up through passages 46, to an end plate of primary portion 14, which is illustrated by a divider 50 in FIG. 1, and then would return to the main coolant outlet through the other series of through passages 46, with peripheral coolant flow traveling through grooves 48 which peripheral flow is schematically illustrated in FIG. 1 at arrows 17, 21.

Plate 40 is also illustrative of the plates used to define auxiliary coolant portion 16, wherein through passages 46 define the main auxiliary coolant flow path, with internal channels positioned therebetween for peripheral auxiliary coolant flow, and with these plates also having external grooves for defining the auxiliary air flow path as desired. In this portion 16 of cell stack assembly 10, (still referring also to FIG. 1), no fuel flow is desirable, and therefore plates in auxiliary coolant portion 16 do not define a fuel flow path.

Turning to FIG. 4, a typical plate 60 which would be used to define cell stack assembly 10' in accordance with the present invention is further illustrated. As shown, plate 60 also has substantially flat sides 62, 64. Each plate 60 has a first portion 66 having through passages 68 and interior coolant passages or grooves 70. Plate 60 defines the primary air and fuel paths as desired with external grooves on sides 62, 64 (not shown) as described above. Plates 60 further have a second portion 72 also having through passages 74 and interior grooves or passages 76 defining auxiliary coolant flow paths. In FIG. 4, a side 62 is illustrated wherein through passages 68 and internal passages or grooves 70 define portions 35 and 37 respectively of the primary coolant path, and through passages 74 and internal passages or grooves 76 define the auxiliary coolant path in similar fashion.

As with the embodiment of FIGS. 1 and 3, in this embodiment additional plates 60 would be provided having different groove structures for defining the air, fuel, and coolant flow paths. Grooves defining the air flow paths would preferably travel along a side of the plate from a top surface 78 of plate 60 to a bottom surface 80 of plate 60, and the portion of such air flow grooves corresponding to the primary coolant passages would constitute the primary air flow passage, which extends from top surface 78. The portion of such air flow grooves defining the air flow passage which corresponds to second portion 72, or the auxiliary coolant flow passage, would constitute the auxiliary air flow passage and would extend to bottom surface 80. Further, plates 60 would be provided having external grooves arranged to define the fuel flow passages which would preferably travel from one side 81 to the other side 83 of plate 60, along a flat side 62, 64, but only in first portion 66 corresponding to the primary air and coolant flow paths.

In this embodiment as well, it should be appreciated that cell stack assembly 10' includes an auxiliary coolant assisted water recovery device which is incorporated into the substantially rectangular-shape of the cell stack-assembly and which increases the size of the cell stack assembly in only one dimension in this case height H (FIG. 2). Further, and advantageously, this embodiment likewise provides such structure and function without additional external devices or ducting and the like.

It should also be appreciated that the flow paths as illustrated in FIGS. 1 and 3 are exemplary of a preferred embodiment of the flow paths for coolant, air and fuel and such paths can be varied to include, for example, multiple flow paths using various turn manifolds as is known in the art. It should also be understood that the cell configuration, while shown to be rectangular, may be configured in any number of other shapes such as square, circular or others, as may be desired for a particular application.

In connection with the embodiment of FIGS. 1 and 3, a particular advantage is that air manifold 18 allows for selective venting of at least partially saturated air or exhaust stream, or feed of this stream to auxiliary coolant portion 16, as desired depending upon the operating conditions. As set forth above, ambient air is typically used as oxidant source for cell stack assemblies such as those described in the present invention, and in some instances, for example when ambient air temperature is sufficiently low, auxiliary cooling and water recovery will not be needed. Thus, this auxiliary cooling capacity can be reserved for when actually needed so as to preserve efficiency of operation of cell stack assembly 10 in accordance with the present invention.

The auxiliary coolant for use in accordance with the present invention may be from any suitable coolant source, and any flowable fluid having a temperature less than the temperature of the at least partially saturated air exhaust stream may be suitable. One excellent source of coolant material is from an associated air-conditioning unit or the like, which provides a readily available supply of coolant at the desired temperature. Of course, other sources of coolant are acceptable and well within the scope of the present invention.

It should also be noted that the embodiments of FIGS. 1 and 2 will both provide excellent benefits in connection with either hydrogen or reformate fuel cells, and the embodiment of FIG. 1 is particularly well suited to embodiments wherein reformate is the fuel source since, in such devices, it is frequently desirable to treat exhaust from the fuel or anode flow path as well, and such exhaust can readily be treated through burners and recycle loops and the like and then fed to air manifold 18 to combine for treatment in auxiliary coolant portion 16 as desired.

In either embodiment, one particular advantage is the provision of auxiliary coolant capability which serves to enhance water recovery from wet or at least partially saturated exhaust streams from the fuel cell, which advantageously allows for broadening of operating parameters of the fuel cell into higher-temperature conditions, without the addition of external components and ducting, and with minimal increase in size and weight, if any, of the fuel cell as desired. In the embodiments of FIGS. 1 and 2, the primary cell stack portion is, of course, a three-dimensional structure, and the auxiliary coolant stack portion extends from each of these structures in a single dimension, which is desirable from the standpoint of minimizing size of the device. This provision of auxiliary coolant for additional water recovery advantageously results in an increase in size, if any, being in less than or equal to one dimension, and this is particularly advantageous in accordance with the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A cell stack assembly, comprising:
a plurality of plates defining a primary cell stack portion having a primary air flow path, a fuel flow path and a primary coolant flow path; an auxiliary coolant stack portion defining an auxiliary air flow path and an auxiliary coolant flow path, said auxiliary air flow path being communicated with said primary air flow path, wherein water is condensed from air in said auxiliary air flow path; and meams for selectively venting said exhaust gas from said air manifold when auxiliary cooling is not needed, and for flowing said exhaust gas to said auxiliary air flow path when auxiliary cooling is needed.

2. The assembly of claim 1, wherein said plurality of plates defines a surface, and further comprising an air manifold positioned along a portion of said surface for communicating said primary air flow path with said auxiliary air flow path.

3. The assembly of claim 1, wherein said auxiliary coolant flow path is communicated with a different coolant source than said primary coolant flow path.

4. The assembly of claim 1, wherein said primary cell stack portion is a three-dimensional structure, and wherein said auxiliary coolant stack portion is within or extends from said three-dimensional structure in less than or equal to one dimension.

5. The assembly of claim 1, wherein said plates have first plate portions defining said primary cell stack portion and second plate portions defining said auxiliary coolant stack portion.

6. The assembly of claim 5, wherein said plates define a substantially rectangular outer shape having a top surface defined by said primary cell stack portions and a bottom surface defined by said auxiliary coolant stack portions, and wherein said primary air flow path extends from said top surface to said auxiliary air flow path, and said auxiliary air flow path extends from said primary air flow path to said bottom surface.

7. The assembly of claim 6, further comprising an air inlet manifold communicated with said top surface and an air outlet manifold communicated with said bottom surface.

8. A method for enhancing water recovery from a cell stack assembly, comprising the steps of:

providing a cell stack assembly comprising a plurality of plates defining a primary cell stack portion having a primary air flow path, a fuel flow path and a primary coolant flow path, and an auxiliary coolant stack portion defining an auxiliary air flow path and an auxiliary coolant flow path, said auxiliary air flow path being communicated with said primary air flow path;

flowing fuel through said fuel flow path and oxidant through said primary air flow path so as to generate electricity from said cell stack assembly and an at least partially saturated exhaust gas from said primary air flow path; and flowing said at least partially saturated exhaust gas through an air manifold to said auxiliary air flow path and an auxiliary coolant through said auxiliary coolant flow path so as to cool said at least partially saturated exhaust stream and condense water from said at least partially saturated exhaust stream.

9. A method for enhancing water recovery from a cell stack assembly, comprising the steps of:

providing a cell stack assembly comprising a plurality of plates defining a primary cell stack portion having a primary ari flow path, a fuel flow path and a primary coolant flow path, and an auxiliary coolant stack portion defining an auxiliary air flow path and an auxiliary coolant flow path, said auxiliary air flow path being communicated with said primary air flow path;

flowing fuel through ssaid flow path and oxidant through said primary air flow path so as to generate electricity from said cell stack assembly and an least partially saturated exhaust gas from said primary air flow; and flowing said at least partially saturated exhaust gas through said auxiliary air flow path and an auxiliary coolant through said auxiliary coolant flow path so as to cool said at least partially saturated exhaust stream and condense water from said at least parially saturated exhaust stream, wherein said plurality of plates defines a substantially rectangular shape, and further comprising an air manifold positioned along a side of said rectangular shape for communicating said primary air flow path with said auxiliary air flow path, and further comprising selectively venting said exhaust gas from said air manifold when auxiliary cooling is not needed, and flowing said exhaust gas to said auxiliary air flow path when auxiliary cooling is needed.

10. A cell stack assembly, comprising:

a plurality of pates defining a primary cell stack portion having a primary air flow path, a fuel flow path and a primary coolant flow path; and an auxiliary coolant stack partion defining an auxiliary air flow path and an auxiliary coolant flow path, said auxiliary air flow path being communicated with said primary air flow path, wherein water is condensed from air in said auxiliary air flow paht, wherein said plurality of plates defines a surface, and futher comprising an air manifold positioned alog a portion of said surface, an outlet of said primary air flow path being communicated with said manifold, and said manifold being communicated with an inlet to said auxiliary air flow path.

* * * * *

UNITED STATES PATENT AND TRADEMARK OFFICE
CERTIFICATE OF CORRECTION

PATENT NO. : 6,716,547 B2
DATED : April 6, 2004
INVENTOR(S) : Whiton et al.

It is certified that error appears in the above-identified patent and that said Letters Patent is hereby corrected as shown below:

Column 6,
Line 33, "meams" should be -- means --.

Column 7,
Line 14, insert -- and -- after the word "manifold".
Line 24, "ari" should be -- air --.
Line 29, "ssaid" should be -- said fuel --.
Line 32, insert -- path -- after the word "flow".

Column 8,
Line 17, "pates" should be -- plates --.
Line 20, "partion" should be -- portion --.
Line 23, "paht" should be -- path --.
Line 25, "alog" should be -- along --.

Signed and Sealed this

Twenty-eighth Day of March, 2006

JON W. DUDAS
*Director of the United States Patent and Trademark Office*